Figure 1:
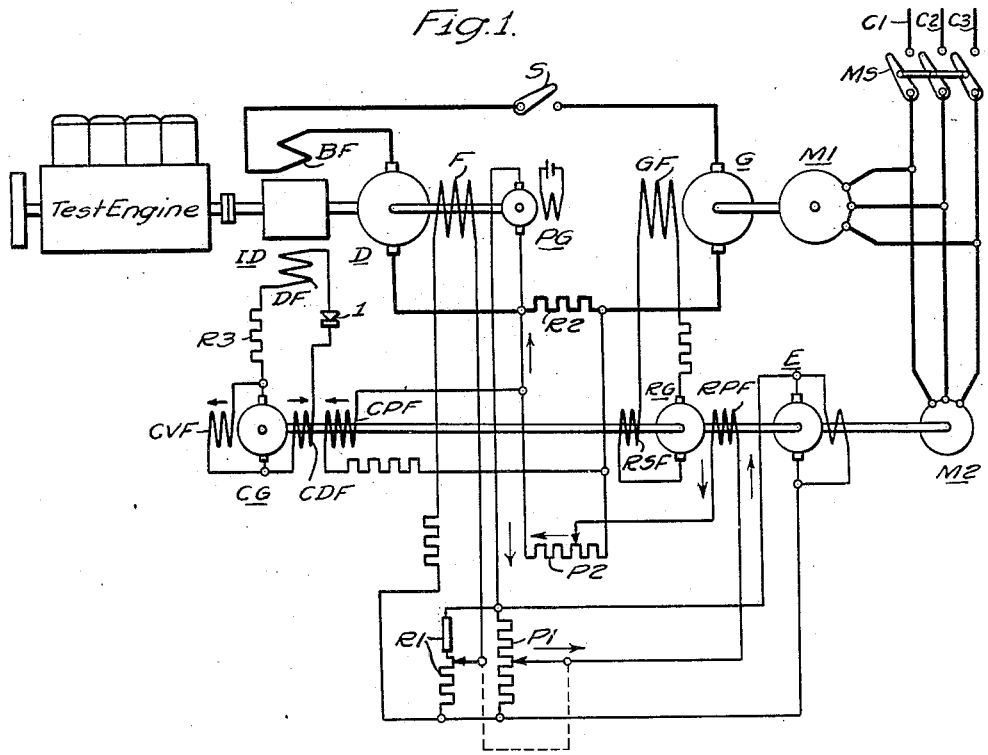

Patented Feb. 17, 1948

2,436,346

UNITED STATES PATENT OFFICE 2,436,346

DYNAMOMETER CONTROL SYSTEM

John R. Wrathall and Joe G. Ivy, Pittsburgh, Pa., assignors to Westinghouse Electric Corporation, East Pittsburgh, Pa., a corporation of Pennsylvania Application August 10, 1945, Serial No. 610,082

8 Claims. (Cl. 73—134)

This invention relates generally to dynamometer apparatus of the type used in testing engines and more particularly to such apparatus embodying combination load absorbing units comprising mechanically coupled machines of the eddy current inductor and direct current types.

In certain of its fundamental aspects this invention is related to a copending application of John R. Wrathall, Serial No. 610,081, filed on the same date as this application, entitled Control system and assigned to the same assignee as this invention.

Combination direct current and eddy current dynamometers are commonly employed in testing engines. In such dynamometer arrangements the direct current dynamometer can operate either as a motor or a generator depending upon whether or not the test engine is tending to run slower or faster than the no load speed of the direct current dynamometer. The eddy current inductor dynamometer is utilized only to absorb the load of the test engine. When operating as a generator, the direct current dynamometer will rapidly change its load with increasing speeds of the test engine. This restricts within relatively narrow limits the variation in speeds which can be tolerated without seriously overloading the direct current dynamometer. For practical considerations the direct current dynamometer is usually only of sufficient capacity to drive the test engine during starting and for running compression and resistance tests thereon. This requires only a fraction of the power which the test engine develops, and consequently, the eddy current inductor dynamometer is normally capable of absorbing several times the rated load of the direct current dynamometer.

When both dynamometers are operated together, as load-absorbing units, adjustments must be made to properly distribute the load between the machines. This is conveniently accomplished by controlling the fields of the respective dynamometers to lower the rate of load buildup on the direct current machine with respect to the eddy current machine, or to increase the rate of proportionate load buildup on the eddy current inductor dynamometer. Such adjustments either singly or in combination, must be made as the speed changes to properly proportion the load between the machines. Certain engine tests require rapid speed changes in test engine operation with proportionate loading between the dynamometers. Under test conditions of this type, automatic proportioning of the load distribution must be provided. The problem of automatic load proportioning, however, is difficult for two reasons. The first is that the eddy current inductor dynamometer usually has several times the capacity of the direct current machine. Thus, the relatively small direct current machine must function to hold the speed while the eddy current inductor machine takes the load swings. The second difficulty is that the fields of the eddy current inductor dynamometer have very high inductance and the machine is quite slow to respond. In order to obviate heavy momentary overload on the direct current unit with load changes, it is essential that the eddy current inductor dynamometer respond very fast to the control intelligences available in the control system.

One of the principal objects of this invention is to provide dynamometer apparatus of the type embodying combination direct current and eddy current load absorbing units having automatic proportioning of the load between the units.

Another and equally important object of this invention is the provision of dynamometer apparatus having a fast and positive control of the load absorbing capacities of the eddy current inductor dynamometer.

Another object of this invention is to provide a combination direct current and eddy current inductor dynamometer apparatus which is simple in its elements and positive in its operation.

A further object of this invention is the provision of a dynamometer apparatus of the character referred to in which the eddy current inductor dynamometer is utilized as the principal load absorbing unit with satisfactory load distribution between the machines following as an automatic consequence of proper regulation of the load absorbing capacities of the principal load absorbing unit.

Yet a further object of this invention is the provision of a dynamometer apparatus of the character described which is efficient in operation.

A still further object of this invention is to provide a dynamometer apparatus of the character described in which effective speed regulating control is provided.

An ancillary object of this invention is to provide a dynamometer apparatus of the type described having a rising speed characteristic with load increase during regenerative periods and a drooping speed characteristic with load increase during motoring periods.

Still another object of this invention is the provision of a dynamometer apparatus in which the principal load absorbing unit is completely unloaded when the direct current unit is functioning as a motor.

Figure 2:
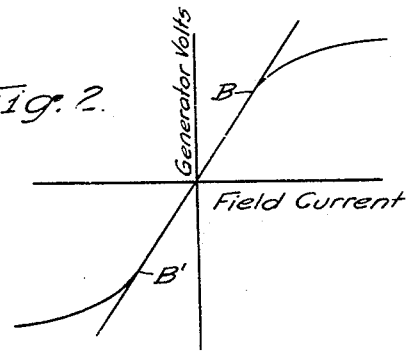

Other objects and advantages will become apparent upon a study of the following specification when considered in conjunction with the accompanying drawing, in which:

Fig. 1 is a diagrammatic illustration of a dynamometer system embodying the principles of this invention, and Fig. 2 is a curve illustrating the operating characteristics of the regulating generator illustrated in Fig. 1.

The load current of the direct current dynamomenter, when it is operating as a generator, is practically proportional to the load absorbed thereby and thus may serve as a suitable reference upon which to base automatic regulation of the load absorbing capacity of the inductor dynamometer. In the hereinbefore-mentioned copending application of John R. Wrathall load absorption control of the inductor dynamometer was accomplished through the medium of a regulating generator controlled in dependence of the regenerative armature currents of the direct current dynamometer. In the instant application, the inductor dynamometer is provided with a pair of differentially connected field windings each of which is capable of exciting the inductor unit to rated torque under all operating conditions and the load absorption control is effected by energizing one of the fields, which we term the braking field of the inductor dynamometer, directly with the armature currents of the direct current unit. Thus, the field control of the inductor dynamometer has to follow the load change of the direct current dynamometer and fast load proportioning control results. With such a load proportioning control arrangement the inductor dynamometer braking field is energized also during motoring periods of the direct current machine. Since, as previously mentioned, it is desirable to keep the size of the direct current machine as small as possible, the inductor dynamometer must be unloaded during motoring periods of the direct current unit. Any control which provides for unloading of the inductor dynamometer should be fast in operation and should function at precisely the correct instant that a minimum of disturbance results. In the instant case the mentioned control is effected by proper excitation of the other inductor dynamometer field which we term the differential field.

In general, for maximum usefulness in testing operations, the dynamometer apparatus should provide the following:

1. Close and accurate speed regulation during load changes from no load to full load or from absorbing to motoring.

2. Load division between the eddy current inductor dynamometer and direct current dynamometer such that neither machine is overloaded when a load absorbing operation is taking place.

3. Automatic change from load absorbing to motoring, with the minimum of speed change when the test engine output is dropped to zero, whether suddenly or gradually.

The dynamometer apparatus of Fig. 1, embodying the principles hereinbefore set forth together with other more detailed principles accomplishes these control functions. In the drawing, the inductor dynamometer ID and the direct current dynamometer D have their rotating elements mechanically connected along a common shaft to the test engine. This dynamometer assembly is illustrated diagrammatically for the purpose of simplifying the illustration of the invention. These units are conventionally connected with their rotors along a common shaft and the shaft is journalled in the respective stators of the machines. A cradle coaxially pivoted with the rotor shaft assembly of the dynamometers carries the stators of these machines. In some units a spring-biased torque arm secured at one extremity to the cradle stator assembly and at its other extremity terminating in a pointer which works along a scale usually calibrated in pound, feet of torque, restrains the cradle stator assembly from unlimited rotation. Thus, the torque of the test engine is transferred by the magnetic coupling of the stators and rotors of the dynamometers to the torque arm which moves along the calibrated scale and indicates the torque developed in the dynamometer-test engine assembly.

The direct current dynamometer is a conventional dynamo which functions either as a motor or a generator, depending on whether the test engine tends to run slower or faster than the no load speed of the direct current unit. This machine has sufficient capacity with the inductor dynamometer unloaded or inactive, to drive the test engine, for example, to start the test engine, run compression and resistance tests thereon, etc. Its load absorbing capacity, however, may be only one-fourth or one-fifth of the capacity of the principal load absorbing unit ID.

Eddy current inductor dynamometers are well known to the art. Physically, one type of these machines is provided with a rotor made of magnetic material and having either a toothed or smooth periphery. This rotor is surrounded by an annular stator which carries the exciting coil or winding. Upon energization of the exciting winding with direct current, a magnetic flux is produced which links the rotor. The magnetic effects in the machine are such as to produce a sharply rising torque characteristic over the lower speed range of operation. Beyond this low speed range, a pronounced knee is formed in the curve. Beyond the knee the curve remains substantially flat indicating a practically constant torque capacity with increasing speeds. This, of course, assumes a constant exciting current in the field. As the strength of the field is increased, the torque capacity also increases, the torque characteristic, however, remaining unchanged. This results in a family of curves limited only by the magnetic saturation of the machine. Engine tests with the eddy current inductor dynamometer as the principal load absorbing unit are usually run at speeds where the torque absorbing capacity remains substantially constant for a given excitation thereof, since the operation is more stable over that range stability being a desirable factor, particularly when automatic inductor dynamometer field control is to be utilized to regulate for constant speed and proper load distribution between the units.

As hereinbefore noted, the load current of the direct current dynamometer armature is substantially proportional to the load which the machine absorbs. Thus, the braking field BF connected in series with the armature circuit of the direct current dynamometer D produces a flux (neglecting losses) which follows the load current of dynamometer D. In this manner, any variation in speed due to a power output rise of the test engine is reflected in an increased flux in the inductor dynamometer, which thereby assumes more of the load and prevents the direct current unit from being overloaded.

The armature circuit of the dynamometer D and the series connected braking field BF of the dynamometer ID are connected through switch S and the resistor R2 in series with the armature of the generator G, the generator being driven by the constant speed motor M1 connected to the power supply denoted by conductors C1, C2 and C3 through the main switch MS. A second constant speed motor M2 connected to the same source as motor M1 drives the exciter E, the regulating generator RG and the control generator CG. Generator G provides a control of the armature voltage of the direct current dynamometer. This control is automatic once a selected speed has been set and the speed is maintained constant or, alternatively imparted a drooping characteristic during motoring and a rising characteristic during load absorbing operation, through the regulating features afforded by the control elements including the regulating generator RG and the pilot generator PG, the latter being operated at a speed proportional to the direct current dynamometer through mechanical connection therewith. The speed control features will be hereinafter described in detail.

In order to unload the inductor dynamometer when the direct current dynamometer D is functioning as a motor, the inductor unit is provided with a differential field DF having the same ampere turns as the braking field, BF, the function of which is to neutralize the braking field. Since the braking field is energized by the armature currents of the direct current unit, these currents may thus provide an exact reference for excitation control of the differential field DF. To this end, the control generator CG is provided with a group of three field windings which include the voltage or shunt field CVF, the series differential field CDF and the control or pattern field CPF. The series differential and voltage fields under stable operating conditions neutralize each other and the control generator output is maintained by the excitation of the pattern field CPF. Pattern field CPF is connected across resistor R2. Hence, its exciting current varies depending upon the armature current of the direct current dynamometer and the differential field of the inductor dynamometer connected in the armature circuit of the control generator along with rectifier I is excited accordingly. Rectifier I is so set in the differential field circuit that current flows therethrough only when the polarity across resistor R2 in the direct current dynamometer armature circuit is the result of motoring currents. The excitation of the differential field is therefore zero when regenerative currents flow in the armature circuit of the direct current unit and the inductor unit absorbs its portion of the load.

Fast transfer of the load from the inductor unit to the direct current unit when the test engine output drops below the output of the direct current unit is obtained by reason of the special characteristics of the control generator. Each of the control field windings of generator CG is, for instance, preferably, although not necessarily, rated for full capacity. The two windings CVF and CDF by reason of their differential connection act in opposition to each other so as to exert a differential effect upon the armature circuit and hence, on the excitation current of the inductor differential field winding DF. The differential windings are adjusted preferably with the aid of a resistor such as R3 located in the load circuit as shown or in the voltage field circuit, or the like variable circuit means, so that their effects on the associated armature circuit are balanced when the system is in a steady operating condition. As a result, the excitation of the inductor dynamometer differential field is in accordance with the control condition then existing as reflected in the control generator by its pattern field winding CPF. However, when the control condition changes, for example, assume a rise in motoring currents in the armature circuit of the direct current dynamometer, the differential balance of the fields CVF and CDF is temporarily disturbed producing an accelerated response or forcing of the inductor differential field DF to the change in excitation of the pattern field. This will be better understood upon a consideration of the electrical conditions existing. The effects of the three windings of the control generator are indicated by the arrows adjacent the windings and represent the action of the fields under motoring operation conditions of the direct current dynamometer. It will be noted from these arrows that the effect of the voltage field CVF is cumulative with respect to the pattern field CPF. When the pattern field excitation changes, the terminal voltage of the control generator changes substantially instantly. The voltage field senses this change and rapidly follows the pattern field change, adding its excitation thereto. The excitation produced by the differential field, however, changes more slowly since, it is connected in series in the highly inductive differential field circuit of the inductor dynamometer. The current change therefore lags the voltage change in the control generator and as a consequence the differential excitation in the control generator is lagging and does not balance the excitation afforded by the voltage field. Therefore, the effect of field CVF on the control generator armature predominates that of the differential field CDF and combines with that of the pattern field CPF to force the control generator voltage well above the final value indicated by the pattern field excitation and thus forces the differential field of the inductor dynamometer. As a consequence, the differential excitation of the inductor dynamometer reaches its new value much more rapidly than in the ordinary case. When the pattern field excitation of the control generator drops, the voltage field again follows the change rapidly while the differential field follows more slowly. The differential excitation now predominates and forces the inductor differential field in the reverse direction at an accelerated rate. It is thus apparent that the use of the special control generator introduces quick response to load changes and by reason of this quick response and the control afforded by the armature currents of the direct current dynamometer provides rapid load transfer in both directions with a minimum of speed change during, or as a result of, load transfer.

Further control of the combination dynamometer speed for close and accurate speed regulation is afforded by the regulating generator RG and its controlling elements. For any given current determined by the setting of rheostat R1 in the field F of the direct current dynamometer, the speed thereof is proportional to the armature voltage. In view of this, it is convenient to regulate the speed over both the armature control and field control range by adjustment of the generator voltage. To this end, the self-energizing regulating generator RG is adjusted to operate on its airgap line so that it can maintain any output along the linear portion of the saturation curve. This operating characteristic is indicated in Fig. 2. Regulating generator RG is provided with two field windings, one the series field RSF and the other the pattern field RPF which controls the generator's output. The resistance of the regulating generator's load circuit or series field circuit is adjusted so that the resistance line thereof, represented by the straight line in Fig. 2, is tangent to the initial straight line portion of the no-load saturation curve of the generator. Thus the generator may have a voltage output equal to the ordinate of any of the points of tangency of the curves, for example, the points B and B' and the function of the pattern field RPF is merely that of supplying the small control quantity for locating the proper operating point of the generator along the tangent curves and maintaining that operating constant for a given control condition. When a control quantity appears across the terminals of the field RPF the voltage of the regulating generator rapidly follows the stimulus to produce a corrective change in the system of a character to remove the control quantity at the pattern field, at which point the regulating generator due to its self-energizing properties maintains the proper output.

The pattern field RPF is controlled in a circuit including the speed controlling potentiometer P1, the pilot generator PG and the potentiometer P2, which latter potentiometer introduces special speed characteristics into the system. Potentiometer P1 is energized by the exciter E and potentiometer P2 is energized by the voltage drop across resistor R2 in the armature circuit of the direct current dynamometer. For the moment, assuming that potentiometer P2 is shunted from the circuit a system which regulates for constant speed is had. This is accomplished by selecting a predetermined voltage at P1 by means of the adjustable tap. This voltage by means of the circuit connections is applied in opposition to the pilot generator output across the pattern field RPF. The excitation supplied by P1 forces the regulating generator voltage up causing the output of generator G to rise and increasing the speed of the dynamometer D (assuming for the moment a motoring condition). The pilot generator voltage builds up as the speed of the direct current dynamometer rises and when equilibrium is reached and the control field excitation is zero the correct output is maintained by the regulating generator. Any departure in speed above or below the selected speed at the potentiometer P1 correspondingly varies the pilot generators output and the resulting differential voltage through the regulating generator, produces a control effect on field GF of the main generator G to correct the speed error. As a matter of operating convenience the rheostat R1 and potentiometer P1 may be so connected mechanically as indicated by the broken line that field weakening for the direct current dynamometer is had simultaneously with increased speed settings at the potentiometer P1 once a certain optimum value of speed regulation by armature voltage alone is had. This is accomplished by providing a metallic section on the rheostat R1 over which the potential drop is zero. Thus as viewed in the drawing as the adjustable taps on P1 and R1 are moved downwardly together the speed change is effected for a certain range of speeds by the output of generator G. Beyond this range the rheostat R1 begins to weaken the field F of dynamometer D.

Rising speed characteristics on load absorbing operation and drooping speed characteristics on motoring operation of the direct current dynamometer are had by inserting the potentiometer P2 into the circuit of the pattern field RPF. The polarity of this quantity is cumulative with respect to the pilot generator output for motoring as the arrows indicate and in opposition thereto for load absorbing. The polarity reversal follows the direct current dynamometer armature currents. Thus, under motoring operation, should the speed tend slightly to drop, the pilot generator output falls tending to initiate a control response at the field RPF. This is countered, however, by a rise in load current in the armature circuit of the direct current dynamometer resulting in a corresponding rise in the voltage of potentiometer P2. The error quantity is therefore reduced or eliminated and the correction to restore the speed in less than that required. As a consequence, the speed tends to fall on increasing motoring loads. On regenerative or absorbing loads, the quantity at P2 opposes the pilot generator, thus if the speed of the direct current dynamometer tends to rise and the load currents also rise, the correction is again less than that required to hold the speed constant, as a consequence the speed tends to rise.

The foregoing disclosure and the showings made in the drawing are merely illustrative of the principles of this invention and are not to be considered in a limiting sense. The only limitations are to be determined from the scope of the appended claims.

We claim as our invention:

1. Dynamometer apparatus for testing prime movers comprising, in combination, an eddy current inductor dynamometer having a rotor and differentially connected field windings, a direct current dynamometer having an armature and a field winding, means for mechanically connecting said rotor and said armature to a prime mover to be driven thereby, means for energizing the armature winding of the direct current dynamometer, means for energizing the field winding of the direct current dynamometer, means for energizing one of the differentially connected field windings of the eddy current inductor dynamometer depending upon the armature currents of the direct current dynamometer, and means constructed and arranged to energize the other of said differentially connected field windings such that the total flux produced by the differentially connected field windings is zero in response only to the armature currents of said direct current dynamometer when functioning as a motor.

2. Dynamometer apparatus for testing a motor comprising, in combination, an eddy current inductor dynamometer having a rotor, a braking field winding and a differential field winding; a direct current dynamometer having an armature and a field winding, means mechanically connecting said rotor and said armature to the moving element of a motor to be tested, means for energizing the armature of said direct current dynamometer, means for energizing the field winding of the direct current dynamometer, means for energizing the braking field winding of the eddy current inductor dynamometer depending upon the armature currents of the direct current dynamometer, and means constructed and arranged to energize said differential field winding for neutralizing the effect of said braking field winding when said direct current dynamometer is functioning as a motor.

3. Dynamometer apparatus for testing a motor comprising, in combination, an eddy current inductor dynamometer having a rotor, a braking field winding and a differential field winding; a direct current dynamometer having an armature and a field winding, means mechanically connecting said rotor and said armature to the moving element of a motor to be tested, means for energizing the armature of said direct current dynamometer, means for energizing the field winding of the direct current dynamometer, means for energizing the braking field winding of the eddy current inductor dynamometer depending upon the armature currents of the direct current dynamometer, means responsive to the armature currents of said direct current dynamometer for energizing the differential field winding of the eddy current inductor dynamometer, and means for maintaining said differential field winding deenergized except when said direct current dynamometer is functioning as a motor.

4. Dynamometer apparatus for testing a motor comprising, in combination, an eddy current inductor dynamometer having a rotor, a braking field winding and a differential field winding; a direct current dynamometer having an armature and a field winding, means mechanically connecting said rotor and said armature to the moving element of said motor, means for energizing the armature winding of the direct current dynamometer, means for energizing the field winding of the direct current dynamometer, means for energizing the braking field winding of the eddy current inductor dynamometer depending upon the armature currents of said direct current dynamometer, a control generator for energizing the differential field winding of the eddy current inductor dynamometer, said control generator having a differential series connected field winding, a voltage field winding and a control field winding, said differential field winding of said control generator having sufficient ampere turns to neutralize said voltage field winding under stable operating conditions of the control generator and insufficient ampere turns to neutralize said voltage field winding under transient conditions, means for energizing the control field winding of the control generator depending upon the armature currents of said direct current dynamometer, and means for maintaining the differential field winding of the eddy current inductor dynamometer deenergized except when said direct current dynamometer is functioning as a motor.

5. Dynamometer apparatus for testing a motor comprising, in combination, an eddy current inductor dynamometer having a rotor, a braking field winding and differential field winding; a direct current dynamometer having an armature and a field winding, means for mechanically connecting said rotor and said armature to the moving element of a motor, circuit means connecting the armature of the direct current dynamometer and the braking field winding of the eddy current inductor dynamometer in series circuit relation, means for energizing said circuit means, means for energizing the field winding of the direct current dynamometer, and means responsive to the armature currents of said direct current dynamometer when functioning as a motor for energizing said differential field winding of the eddy current inductor dynamometer and neutralizing the effect of the braking field winding thereof.

6. Dynamometer apparatus comprising, in combination, an eddy current inductor dynamometer having a braking field winding and a differential field winding, a direct current dynamometer, means mechanically connecting said dynamometers, means for exciting the direct current dynamometer, means for exciting the braking field winding of the eddy current inductor dynamometer depending upon the load current of the direct current dynamometer, and means for exciting the differential field winding of the eddy current inductor dynamometer depending upon the load current of said direct current dynamometer when functioning as a motor.

7. Dynamometer apparatus for testing a motor comprising, in combination, an eddy current inductor dynamometer, a direct current dynamometer, means for mechanically connecting said dynamometers, to said motor, generating means for energizing the direct current dynamometer, means for proportioning the load absorbed by said dynamometers when driven by said motor to be tested, means for reducing the load absorbing capacities of the eddy current dynamometer to zero when the direct current dynamometer is operated as a motor, excitation means for said generating means, means for producing a first electrical quantity having a substantially constant magnitude, means for producing a second electrical quantity which varies depending upon the operating speed of said direct current dynamometer, means for producing a third electrical quantity which varies depending upon the load current of the direct current dynamometer, means for combining the first, second and third electrical quantities such that said first and second electrical quantities are in opposed relationship and said third electrical quantity is cumulative with respect to said second electrical quantity when said direct current dynamometer is functioning as a motor and in opposition to said second electrical quantity when said direct current dynamometer is functioning as a generator, and means responsive to said combined electrical quantities for controlling said excitation means.

8. Speed regulating apparatus comprising, in combination, an electrical machine to be controlled, generating means for energizing said electrical machine to effect operation thereof, excitation means for controlling the electrical output of said generating means, means for producing a first electrical quantity having a magnitude indicative of a selected operating speed for said electrical machine, means for producing a second electrical quantity having a value depending upon the speed of operation of said electrical machine, means for producing a third electrical quantity having a value depending upon the load current of said electrical machine, means for combining said first, second and third electrical quantities such that said first and second electrical quantities are in electrical opposition and said third electrical quantity is cumulative with respect to said second electrical quantity, and means responsive to said combined electrical quantities for controlling said excitation means.

JOHN R. WRATHALL.
JOE G. IVY.

REFERENCES CITED

The following references are of record in the file of this patent:

UNITED STATES PATENTS

| Number | Name | Date |
| --- | --- | --- |
| 2,298,076 | Whiting | Oct. 6, 1942 |
| 2,394,131 | Wrathall | Feb. 5, 1946 |

FOREIGN PATENTS

| Number | Country | Date |
| --- | --- | --- |
| 112,203 | Great Britain | Dec. 19, 1940 |